Feb. 9, 1937.                C. MILLER                2,070,020
                           SIGNALING DEVICE
                         Filed June 13, 1932
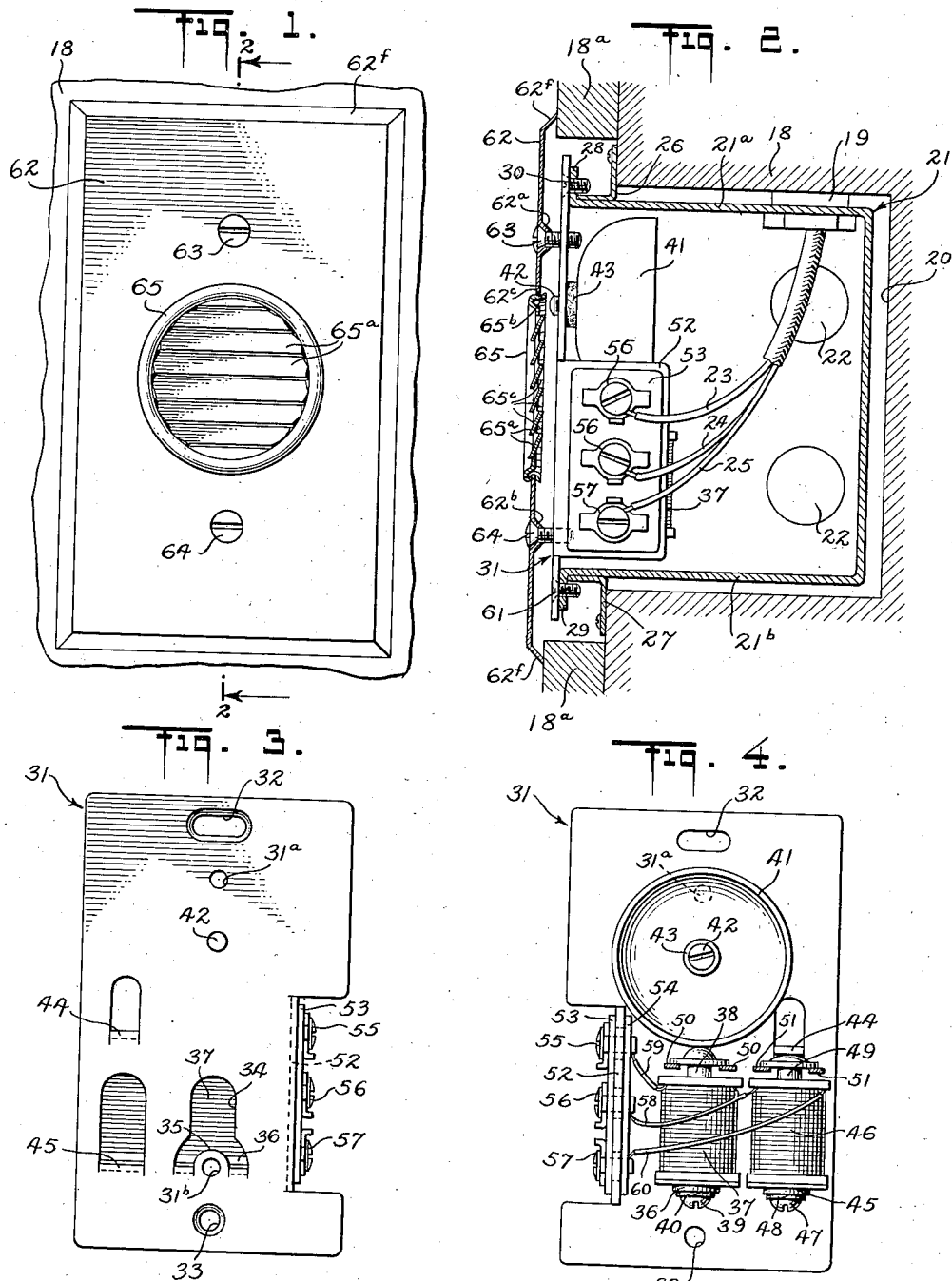
INVENTOR
Christian Miller
BY
James Blair Curts
ATTORNEYS Patented Feb. 9, 1937

2,070,020

UNITED STATES PATENT OFFICE 2,070,020

SIGNALING DEVICE

Christian Miller, New York, N. Y., assignor to Edwards and Company, Inc., a corporation of New York Application June 13, 1932, Serial No. 616,855

8 Claims. (Cl. 177—7)

This invention relates to signaling apparatus and more particularly to the construction and installation of audible signaling devices such as electric buzzers, bells, and the like.

One of the objects of this invention is to provide an inexpensive, simple, and compact signaling construction capable of rapid manufacture at low cost and capable of rapid and inexpensive installation. Another object is to provide a construction of the above-mentioned character which when installed will be neat in appearance and thoroughly practical and reliable. Another object is to provide a signaling installation in which certain parts now of standard manufacture may be inexpensively and dependably utilized. Other objects will be in part obvious or in part pointed out hereinafter.

The invention accordingly consists in the features of construction, combinations of elements, and arrangements of parts as will be exemplified in the structure to be hereinafter described and the scope of the application of which will be indicated in the following claims.

In the accompanying drawing in which is shown one of various possible embodiments of my invention, Figure 1 is a front elevation of the installed signaling apparatus;

Figure 2 is a vertical central sectional view as seen along the line 2—2 of Figure 1, certain parts being, however, shown in elevation;

Figure 3 is a front elevation of the buzzer and bell unit of Figure 2 as the unit would be seen if viewed from the left in Figure 2, and Figure 4 is a rear elevation of the buzzer and bell unit as seen from the rear of Figure 3 or as seen from the right in Figure 2.

Similar reference characters refer to similar parts throughout the several views of the drawing.

Referring now more particularly to Figures 1 and 2, I have shown at 18 a wall or like part of a building with respect to which my signaling apparatus is to be installed. The wall 18 may be of any construction usual in building construction work and may have led therethrough or buried therein any suitable form of conductor-carrying conduit, indicated at 19 and illustratively taking the form of metal conduit or piping, the conduit 19 terminating in a recess 20 fashioned in any suitable way in the wall.

The recess 20 is of sufficient size to receive therein a sheet metal outlet box generally indicated at 21 and conveniently taking the form of any standard type of conduit or outlet box such as is used in practice and is readily available on the market for mounting switches, outlets, and the like. The box 21 is provided with suitable knock-outs 22, any one of which may be removed to permit the connection to the box of, for example, the conduit 19 so that the suitably insulated cable, illustratively carrying three insulated conductors 23, 24 and 25, may be brought into the interior of the box 21 and the conductors made available for connection to the signaling device or devices.

The box 21 is provided with any suitable means such as brackets 26 and 27, better shown in Figure 2 and preferably related or secured to the upper and lower end walls 21ª and 21ᵇ of the box and by these lugs or brackets 26—27, the box 21, as by screws or the like, may be secured in position in the recess 20 in the wall and with its open end (the left-hand end as seen in Figure 2) adjacent the plane of the plaster or other finish with which the wall is completed.

The upper and lower end walls 21ª and 21ᵇ of the box 21 (Figure 2) are also provided with suitable supporting means preferably taking the form of flanges or lugs 28 and 29, preferably formed integrally with the walls of the box and each provided with a threaded hole or opening; moreover, these threaded openings, if the box is of standard construction as is preferably the case, are spaced vertically from each other (as viewed in Figure 2) by a given or fixed and now standard distance.

Bridged vertically across the open end of the box 21 and resting against the ears or flanges 28—29 and secured thereto as by screws 30 and 61, respectively, is my audible signaling unit which includes a flat plate 31 (see also Figure 3) made of sheet metal of appropriate thickness or weight and having a length in a vertical direction sufficient to cause it to overlap and rest against the lips 28—29, being provided with openings or slots 32—33 (Figure 3) spaced by the same distance as are the threaded openings in the ears 28—29 and through which the screws 30, 61 pass to secure the plate 31 to the box.

The horizontal or lateral dimension of the plate 31, as viewed in Figure 3, is such that it virtually closes the open end of the box 21 where the latter is of the single unit size. The plate 31 preferably, as above noted, forms part of the signaling device and preferably coacts with certain parts thereof in a unique way.

For example, referring now to Figure 3, the plate 31 is cut or severed along the lines 34 and 35 to form a tongue or lug 36 which is bent at right angles to the plane of the plate 31, being bent away from the observer, viewing Figure 3, and toward the observer, viewing Figure 4. This tongue, extending along the median line of the plate 31, forms a rigid support on the rear face of the plate, as viewed in Figure 3, for a magnet winding 37 (see Figure 4) preferably taking the form of a solenoid whose core 38, suitably spring-opposed, is thus mounted for movement in a vertical direction along the median plane of the plate 31. A screw 39 (Figure 4) with a lock washer 40 rigidly secures the solenoid 37 to the rigid lug 36.

To the rear face of the plate 31, as viewed in Figure 3, and to the front face thereof as viewed in Figure 4, there is secured, in any suitable way, a gong 41 of any suitable shape, conveniently of the usual shape, as is better shown in Figures 2 and 4. The gong 41, if of symmetrical shape, is preferably secured on the median line of the plate 31 as by a screw 42 (Figures 2 and 4) threaded into the plate 31, any suitable yieldable or cushioning means, generally indicated at 43, being employed, if desired, to acoustically insulate the gong 41 from the rigid plate 31, thus to negative any possible effect of the rigid plate in damping the acoustic vibration of the gong. This means may take the form of felt washers, semi-rigid rubber, or the like.

The gong 41 will thus be seen to be positioned along the center line of the plate 32 so that when the latter is mounted in position with respect to the box 21, as above described and as is shown in Figure 2, the gong 41 projects or extends into the box as does also the gong-striking mechanism 37—38 (Figure 4), these and other parts to be more clearly described below being, moreover, adequately protected by the plate 31 itself, the plate 31 acting virtually as a closure or cover for the box 31 where the latter is of the single unit size or acting also as a cover for the signaling mechanism where the box is of greater dimension horizontally as viewed in Figure 2 and where it is intended to receive two or more electrical units.

To the left of the center line of the plate 31, as viewed in Figure 3, the plate 31 has two lugs or ears 44 and 45 cut out of it and bent at right angles to the plane of the plate 31 and in a direction away from the observer, viewing Figure 3; to one of these lugs or ears, namely lug 45, which, as is better shown in Figure 4, is alined with the ear 36 which supports the gong-striking mechanism 37—38, there is mounted part of the buzzer mechanism which preferably takes the form of a magnet winding in the form of a solenoid 46 whose core is secured to the lug 45 by means of a screw 47 and lock washer 48.

The plunger or movable core 49 of the solenoid 46 is spring-opposed and its movement in an upward direction is limited by the lug 44 which is bent out of the plate 31 as above described.

Thus, the two solenoids 37—38 and 46—49 are mounted side by side and, together with the gong 41, fall within the area of the plate 31 and will be seen to be on the rear face of the latter as viewed in Figure 3.

The movable cores 38 and 49 of the two solenoids are urged in an upward direction, as viewed in Figure 4, by bifurcated leaf springs 50—51, respectively, the latter being secured to the plate 31 in any suitable manner as by riveting or spot welding; the arms of these bifurcated springs engage under the headed upper ends of the solenoid plungers, spring 50 urging and tending to hold the plunger 38 in engagement with the gong 41 and spring 51 urging and tending to hold the plunger 49 against the ear 44 of the frame 31.

If, now, the windings 37 and 46 are energized by a suitable varying or pulsating current, the increases or pulsations in an increased direction of the current retract the plungers against the actions of the springs and when the current drops to zero or becomes so small as will allow the springs 50—51 to overcome the magnetic pull, these springs move the plungers quickly upwardly, causing the headed plunger 38 to strike the gong and causing the headed plunger 49 to strike the rigid ear 44 of the plate 31. In the former case, a musical note depending upon the pitch of the gong 41 is produced and in the latter case, due to the plunger 49 striking the rigid and dead lug 44, a strong buzzing sound is produced.

Illustratively, the windings 37 and 46 may be arranged to be energized by alternating current of commercial frequency, such as 60 cycles.

The detailed construction and mounting of the solenoids and their cores and springs may take the form as is described in my co-pending application Serial No. 502,651, filed December 16, 1930.

A side edge portion of the plate 31 (Figure 3) alongside of the solenoid 37 is bent substantially at right angles to the plane of the plate 31 and in a direction away from the observer, viewing Figure 3, thus forming a supporting flange 52 (see also Figures 2 and 4) which extends vertically alongside of the gong-ringing mechanism 37—38 and alongside of part of the gong 41 itself. If desired, the supporting flange 52 may be made of a length in a direction at right angles to the plate 31 commensurate with the diameter of the solenoids 37 and 46, as appears better in Figure 2, thus virtually forming a protective side wall for these parts.

The supporting flange 52 carries and has secured thereto, in any suitable manner, a small panel of insulating material, such as hard rubber or fiber, preferably taking the form of two sheets of this material, indicated at 53 and 54 (Figure 4), one on the left-hand face of the supporting flange 52 and the other on the right-hand face. The insulating panel 53—54 carries a suitable number of binding posts which it thus insulates from the sheet metal frame 31 and related parts. Illustratively, I have shown three binding posts 55, 56 and 57 in the form of binding screws whose heads are exposed toward the side edge of the plate 31 (Figures 3 and 4) so that the conductors 23—24—25 (see Figure 2) from the conduit 19 may be connected thereto. The rear portions of the connecting terminals as viewed in Figure 2, or rather the right-hand portions thereof as viewed in Figure 4, are permanently connected to the electromagnetic parts of the signaling mechanism. For example, a suitably insulated conductor 58 connects two ends or terminals, one from each of the windings 37 and 46, to the center binding post 56, an insulated conductor 59 connects the remaining end of the winding 37 of the bell-ringing mechanism to the connecting terminal 55 and an insulated conductor 60 connects the remaining terminal of the winding 46 to the connecting terminal 57. These last-mentioned connecting conductors are thus installed upon the assembly of the signaling unit, for example in the factory, whereupon the unit is ready for installation.

Thus, for example, the cable having been brought through the conduit 19 and the conductors 23—24—25 thereof connected to the connecting terminals or binding screws 55, 56 and 57 (see Figure 2) the circuits may be tested and proved, whereupon the signaling mechanism is secured in place in the box 21 by bridging the plate 31 across the box 21, all as above described, and securing the plate 31 to the box as by the screws 30 and 61. The plate 31 thus closes off the signaling mechanism, forming in effect a closure for the box, whereupon the plastering or other finish may be applied to the wall 18. Painting, or the like, of the wall and all such finishing of the wall may be carried on, the plate 31 protecting the operating mechanism of the signaling devices during these operations.

The wall having been finished (the plaster is indicated in Figure 2 at 18ª, by way of example), there is now secured over the plate 31 a finishing plate 62 (Figures 1 and 2) which preferably takes the form of a standard finishing or wall plate provided, as is usual, with countersunk holes 62ª and 62ᵇ (Figure 2) spaced apart by a standard distance, for the reception of securing screws. The finishing plate 62 that I prefer to employ is preferably of the kind that has an opening stamped in it and illustratively this opening may be circular or substantially so, being indicated at 62ᶜ. The plate 62, with such a round opening 62ᶜ therein, may thus be of the type that has heretofore been employed in covering over an electrical outlet though it is to be understood that other shapes or sizes of openings, preferably such as are common in standard wall plates, may be employed.

The plate 31 is provided with two threaded openings (see Figure 3) at 31ª and 31ᵇ, these openings being spaced by the same distance as are the holes 62ª and 62ᵇ in the standard finishing plate 62. Screws 63 and 64 (Figures 1 and 2) are then passed through the countersunk openings in the finishing plate 62 and threaded into the openings 31ª and 31ᵇ in the plate 31, thus securing the latter in place. Moreover, finishing plate 62 is dimensioned so that it substantially overlaps the box 21 (see Figure 2) and lays flush against the finish part 18ª of the wall 18, the plate 62 being flanged as at 62ᶠ if desired.

Into the opening 62ᶜ in the plate 62, either before the plate 62 is put in place or even after it is secured in place as above described, I mount what I may term a sheet metal wafer or disk-like member 65 stamped in any suitable way to have suitable openings but preferably cut crosswise, as viewed in Figure 1, and having the portions intervening the transverse cuts bent outwardly and downwardly, thus to form a series of louvers 65ª. The louver member 65 may be secured to the plate 62 in any suitable manner, preferably in a way to permit of its quick and easy attachment. For example, the sheet metal member 65 may be provided with an outwardly concaved flange 65ᵇ which preferably extends throughout its entire periphery and which is preferably severed at suitable intervals, as at 65ᶜ, thus to form out of the peripheral flange 65ᵇ a large number of individually yieldable tongues, each of which is outwardly concave so as to receive the sheet metal of the finishing plate 62 therein. With this construction, the louver member 65 may be pressed or snapped into the opening 62ᶜ in the plate 62, whence its yielding peripheral flange 65ᵇ, tending to expand, interlocks securely with the sheet metal of the plate 62 bounding the opening 62ᶜ. From this construction and action it will be perceived and understood that the louver member 65 will preferably be pressed or snapped into the opening 62ᶜ in the plate 62 from the inside or rear face of the plate 62 (the right-hand face thereof as viewed in Figure 2) and, of course, that this is done preferably prior to assembling the plate 62 to the inside cover plate 31, and it will be seen that I am thus enabled, particularly where the finishing plate 62, as earlier above-mentioned, is of a standard and heretofore well known construction, already containing usually a round opening 62ᶜ, to readily and inexpensively convert such a standard form of apertured wall plate into a louvered wall or finishing plate. It will also be seen, particularly by reference to Figure 2, and because of the above-described preferred form of construction and assembly of the members 65 and 62, that the tendency of the yielding peripheral flange 65ᵇ to expand makes it far more difficult (if not impossible) to remove the member 65 from the opening 62ᶜ by moving it to the left, as viewed in Figure 2, than it is by moving it inwardly or to the right, as viewed in Figure 2. Accordingly, the expanding peripheral flange and its coaction with the walls of the opening 62ᶜ are found in practice to be adequate to prevent removal of the louver member 65 by attempting to give it a movement outwardly or to the left (in Figure 2), while I prefer, in order to negative the possibility of complete dislodgment of the louver member 65 from the plate 62 by forcing or pushing it inwardly or to the right (in Figure 2), to maintain the spacing between the finishing plate 62 and the inside cover plate 31 and/or a projecting part thereof, such as the end of the screw 42 (Figure 2) such that there is insufficient space to completely force the member 65 inwardly and out of the opening 62ᶜ. As is clearly seen from Figure 2, movement of the member 65 to the right sufficient to completely dislodge it from the opening 62ᶜ is prevented by the flange 65ᵇ colliding with and being stopped by the inside cover plate 62 or the screw 42, or both.

Thus, the opening 62ᶜ is closed against access therethrough of foreign matter, such as dirt, dust, or the like, due to the action of the louvers 65ª and yet is still open to permit the free emission through the plate 62 of the sound produced by the audible signaling devices within the box 21. In this latter connection, the openings in the plate 31 formed by the stamping and bending of the various tongues or lugs, such as the parts 44, 45, 36 and 52, for example, of Figure 3, coact in aiding in the transmission of the sound from the signaling devices inside of the box 21 past or through the inside cover plate 31.

The resultant installation will be seen to be compact and thoroughly dependable and, moreover, neat in exterior appearance. Moreover, the construction will be seen to be inexpensive and compact and lends itself not only to inexpensive manufacture on a quantity scale but also to rapid and convenient installation.

Thus, it will be seen that there has been provided in this invention a construction in which the various objects above noted, together with many thoroughly practical advantages, are successfully achieved.

As many possible embodiments may be made of the above invention and as many changes might be made in the embodiment above set forth, it is to be understood that all matter hereinbefore set forth, or shown in the accompanying drawing, is to be interpreted as illustrative and not in a limiting sense.

I claim:

1. In a signaling installation, in combination, a conduit box having a knock-out in a wall thereof, a signaling unit related to said box, said signaling unit comprising a plate-like member bridged across and extending substantially in the plane of the open end of said box and substantially closing the said end, said plate having a portion extending transversely thereto and in a direction into the box, a terminal board carrying a connecting terminal and mounted upon said inwardly extending portion of said frame, electromagnetic signaling means carried on the inner face of said plate and having an electrical connection to said connecting terminal, said connecting terminal being adapted to have connected thereto a conductor brought into the box through said knock-out, and a finishing plate secured to said first-mentioned plate.

2. In a signaling installation, in combination, a conduit box having a knock-out in a wall thereof, a frame bridged between and secured to opposed sides of said box, said frame extending substantially in the plane of the open end of said box and thereby substantially closing the latter, signaling means carried by said frame, said frame carrying a terminal board within said box and extending in a plane at right angles to the plane of the open end of said box, said terminal board having a connecting terminal that is in electrical connection with said signaling means and being adapted to have secured thereto a conductor brought into the box through said knock-out, and a finishing plate overlapping said box and secured to said frame.

3. In a signaling installation, in combination, an outlet box having flanged end walls each provided with a threaded opening for receiving a screw and having a wall thereof provided with a knock-out, an electric signaling device having a connecting terminal adapted to be connected to a conductor brought into said box through said knock-out, a frame carrying said signaling device and having portions adapted to rest against said flanged end walls, screws threaded into said threaded opening for securing said frame to said box, said frame having vertically spaced threaded openings, a finishing plate dimensioned to overlap said box and having a louvered portion, and screws threaded into the threaded openings of said frame for securing said finishing plate in box-closing position.

4. A signaling unit comprising, in combination, a sheet metal plate having end portions adapted to overlap the supporting portions of an outlet box, said plate being dimensioned to substantially close the open end of said box, audible signaling means carried by said plate on that side thereof facing inwardly of said box, a finishing plate of greater dimensions than said first-mentioned plate and adapted to overlap the latter, and means for securing said finishing plate to said first-mentioned plate.

5. A signaling unit comprising, in combination, a sheet metal plate having end portions adapted to overlap the supporting portions of an outlet box, said plate being dimensioned to substantially close the open end of said box, said plate having a portion bent inwardly thereof and substantially at right angles thereto, electromagnetic signaling means carried on the inner face of said plate, and a terminal board carried by said portion and having connecting terminals, and conductive means placing said terminals in electrical connection with said signaling means.

6. A signaling unit comprising, in combination, a sheet metal plate having end portions adapted to overlap the supporting portions of an outlet box, said plate being dimensioned to substantially close the open end of said box, a gong carried on the inner face of said plate, said plate having a portion thereof bent out of the plane thereof and in a direction inwardly of said box, and electromagnetic gong-striking mechanism carried by said portion.

7. A signaling unit comprising, in combination, a sheet metal member having end portions adapted to overlap the supporting portions of an outlet box, said sheet metal member having two parts thereof bent substantially at right angles to the plane of said end portions, and electromagnetic vibrating mechanism having a vibrating member, means supporting said mechanism from one of said parts, said other part being positioned to be struck by said vibrating member.

8. In a signaling installation, in combination, an outlet box embedded in a wall and having supported therein signaling means, a finishing plate bridged across said box and having its edges in engagement with said wall, said finishing plate having a relatively large opening therein in a portion thereof overlying said box, and a flanged apertured member of sheet material closing said opening, the flange of said member being yieldable and making engagement with the periphery of said opening, thereby to hold said member in opening-closing position.

CHRISTIAN MILLER.